(12) United States Patent
Yasutake

(10) Patent No.: US 12,704,694 B2
(45) Date of Patent: Aug. 11, 2026

(54) LENS BARREL

(71) Applicant: CANON KABUSHIKI KAISHA, Tokyo (JP)

(72) Inventor: Yuta Yasutake, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 451 days.

(21) Appl. No.: 18/335,858

(22) Filed: Jun. 15, 2023

(65) Prior Publication Data

US 2023/0408789 A1 Dec. 21, 2023

(30) Foreign Application Priority Data

Jun. 17, 2022 (JP) ................................ 2022-098474

(51) Int. Cl.
*G02B 7/02* (2021.01)

(52) U.S. Cl.
CPC ............ *G02B 7/021* (2013.01); *G02B 7/023* (2013.01); *G02B 7/025* (2013.01); *G02B 7/026* (2013.01)

(58) Field of Classification Search
CPC ........ G02B 7/021; G02B 7/023; G02B 7/025; G02B 7/026; G02B 7/08
See application file for complete search history.

(56) References Cited

U.S. PATENT DOCUMENTS

2013/0063832 A1 3/2013 Ohno
2016/0062071 A1 3/2016 Hasegawa
2016/0209617 A1 7/2016 Mitani

FOREIGN PATENT DOCUMENTS

JP 2012123220 A 6/2012
JP 2018021967 A 2/2018

*Primary Examiner* — Jack Dinh

(74) *Attorney, Agent, or Firm* — Canon U.S.A., Inc. IP Division

(57) ABSTRACT

According to an aspect of the present invention, a lens barrel includes a first lens holding frame, a second lens holding frame, and a sheet member configured to be sandwiched between the first lens holding frame and the second lens holding frame, wherein the second lens holding frame is provided with at least two first nip portions, wherein the first lens holding frame is provided with at least two second nip portions, wherein the sheet member is provided with first sheet portions and second sheet portions, and wherein radial widths of the second sheet portions are smaller than radial widths of the first sheet portions.

13 Claims, 9 Drawing Sheets

FIG.1A
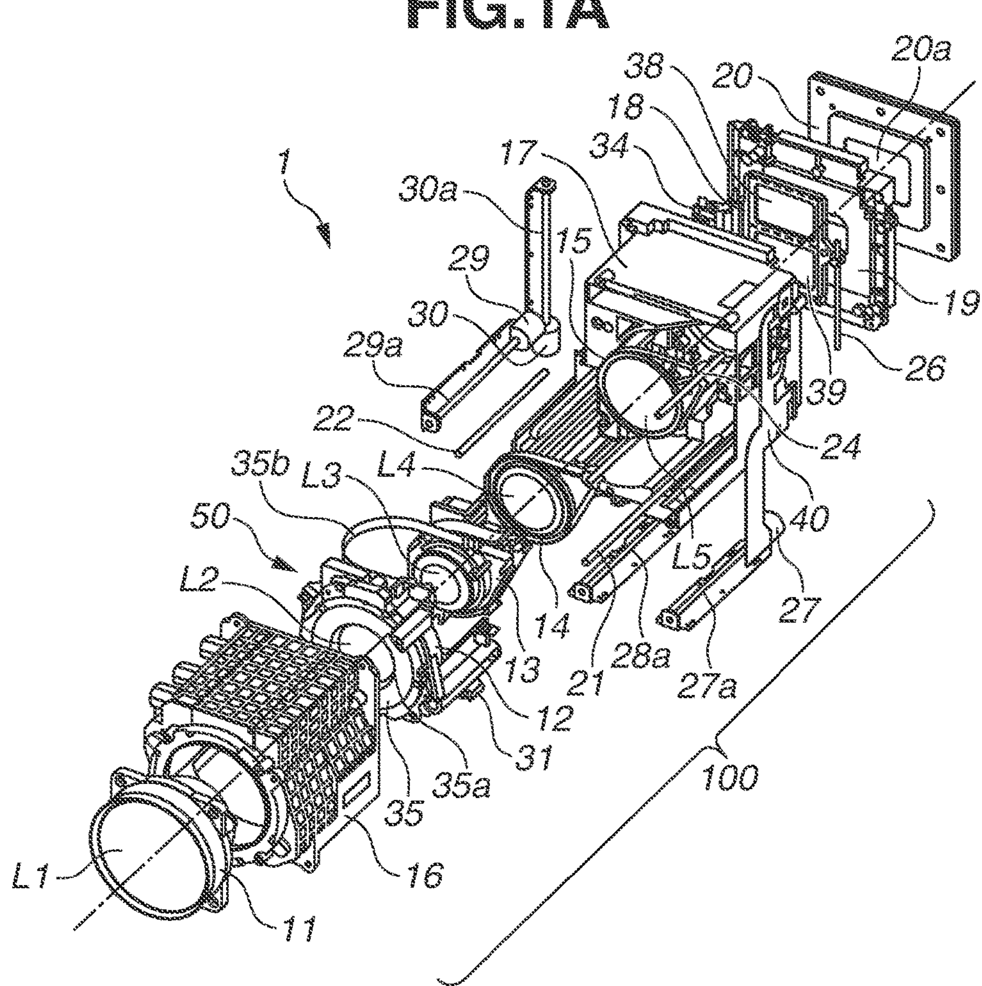
FIG.1B
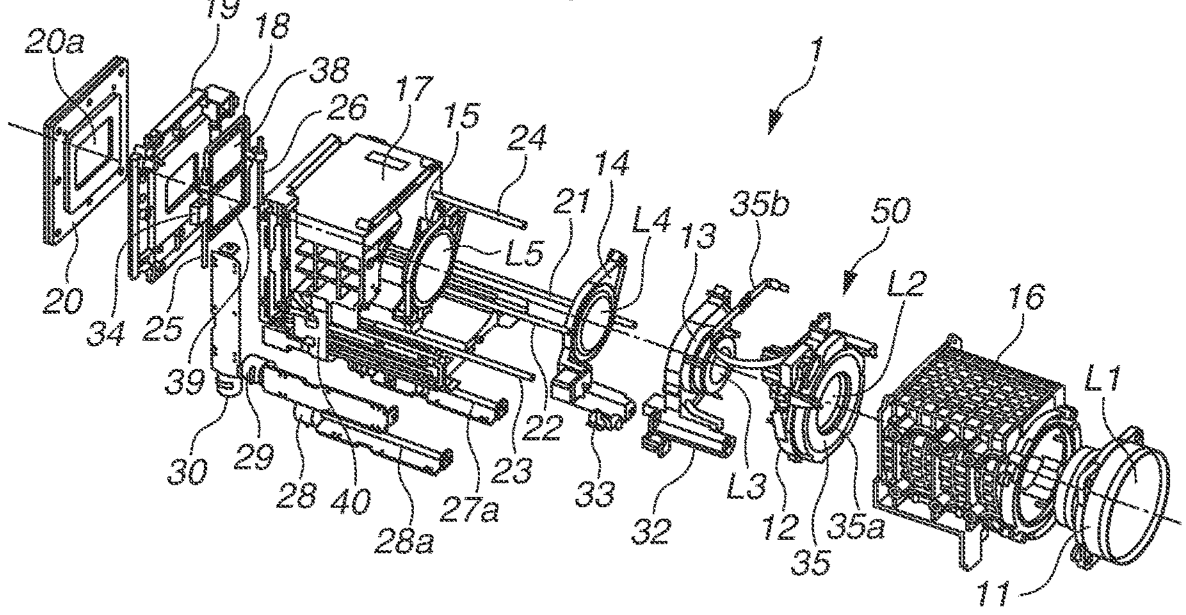

LENS BARREL

BACKGROUND OF THE INVENTION

Field of the Invention

The present invention relates to lens barrels, and more particularly, to a lens barrel that subjects lenses or lens holding frames to a plurality of optical adjustments.

Description of the Related Art

To reduce the influence of manufacturing errors and assembly variations to improve the optical performance, a lens barrel may be provided with an adjustment mechanism for adjusting the position of lenses or lens holding frames.

For example, Japanese Patent Application Laid-Open No. 2012-123220 discusses a lens barrel provided with a spacer having a predetermined thickness between lenses, and an adjustment mechanism for enabling clearance adjustment between lenses in the optical axis direction.

Japanese Patent Application Laid-Open No. 2018-021967 discusses a lens barrel provided with an adjustment mechanism for enabling eccentricity adjustment in which an adjustment target lens is translated along a plane intersecting with the optical axis, and the optical axis of a reference lens is matched with the optical axis of the adjustment target lens.

With a lens barrel having high-resolution performance, lenses or lens holding frames may be subjected to a plurality of position adjustments because of the high accuracy requirement of lens positions.

Examples of position adjustments will be described below. Firstly, like Japanese Patent Application Laid-Open No. 2012-123220, clearance adjustment is performed by inserting a sheet member between an adjustment lens holding frame for holding an adjustment target lens and a reference lens holding frame for holding a reference lens. Subsequently, like Japanese Patent Application Laid-Open No. 2018-021967, eccentricity adjustment is performed by translating an adjustment lens holding frame with respect to a reference lens holding frame along a plane intersecting the optical axis.

However, if the sheet member is thin, the sheet member may be deformed and twisted by an external force applied during the eccentricity adjustment. If the sheet member positioned between the receiving planes of the reference lens and adjustment lens holding frames is twisted, the adjustment target lens may possibly incline with respect to the reference lens. This adversely affects the optical performance of the lens barrel.

SUMMARY OF THE INVENTION

The present invention is directed to providing a lens barrel capable of performing high-accuracy position adjustments of lenses or lens holding frames with a simple configuration.

According to an aspect of the present invention, a lens barrel capable of performing position adjustments by moving a first lens holding frame for holding a first lens in a direction intersecting with an optical axis includes a first lens holding frame configured to hold a first lens, a second lens holding frame configured to hold a second lens, and a sheet member having an approximately annular shape configured to be sandwiched between the first lens holding frame and the second lens holding frame, wherein the second lens holding frame is provided with at least two first nip portions for sandwiching the sheet member between the first lens holding frame and the second lens holding frame, wherein the first lens holding frame is provided with at least two second nip portions for sandwiching the sheet member between the first lens holding frame and the second lens holding frame, wherein the sheet member is provided with first sheet portions to be sandwiched by the first and second nip portions, and second sheet portions not to be sandwiched by the first and second nip portions and to be positioned between the first and second nip portions in a circumferential direction of the sheet member, and wherein radial widths of the second sheet portions are smaller than radial widths of the first sheet portions.

Further features of the present invention will become apparent from the following description of embodiments with reference to the attached drawings.

BRIEF DESCRIPTION OF THE DRAWINGS

FIGS. 1A and 1B are explosive perspective views illustrating an imaging apparatus according to a first embodiment of the present invention.

DESCRIPTION OF THE EMBODIMENTS

Embodiments of the present invention will be described in detail below with reference to the accompanying drawings. However, sizes, materials, and relative positions of components according to the following embodiments are optional and can be modified depending on the configuration of an apparatus according to the present invention and other various conditions. Descriptions of parts not directly related to the present invention will be omitted, and these parts will not be illustrated. For the convenience of explanation, shapes of parts may be simplified. Each of the embodiments of the present invention described below can be implemented solely or as a combination of a plurality of the embodiments or features thereof where necessary or where the combination of elements or features from individual embodiments in a single embodiment is beneficial.

A first embodiment will be described below centering on an imaging apparatus according to an embodiment of the present invention.

Figure 2A:
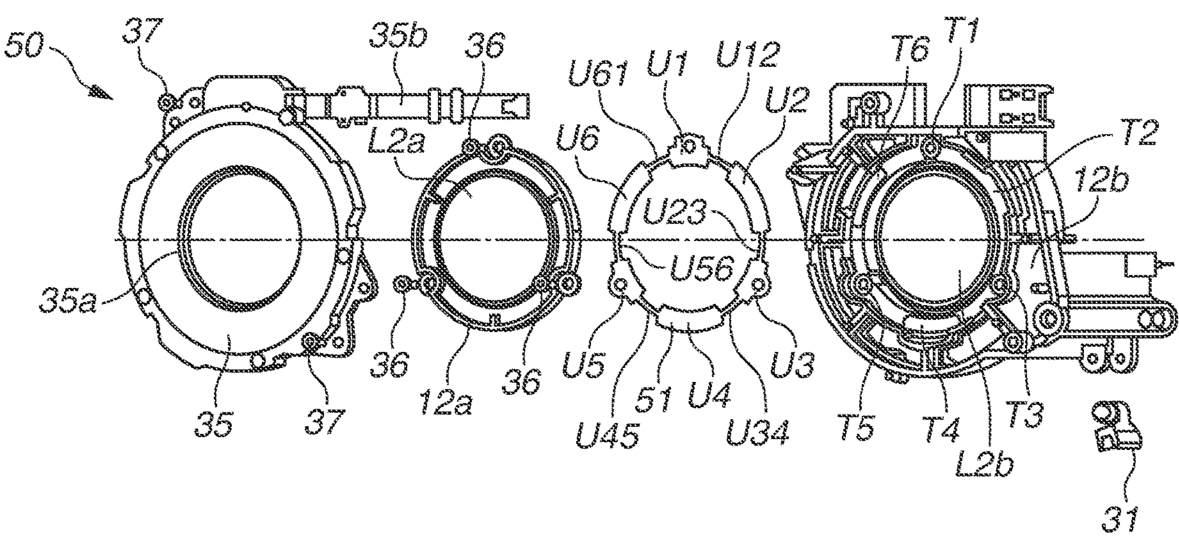
FIG. 2A and are exploded perspective views illustrating a second lens unit according to the first embodiment of the present invention.
Figure 2B:
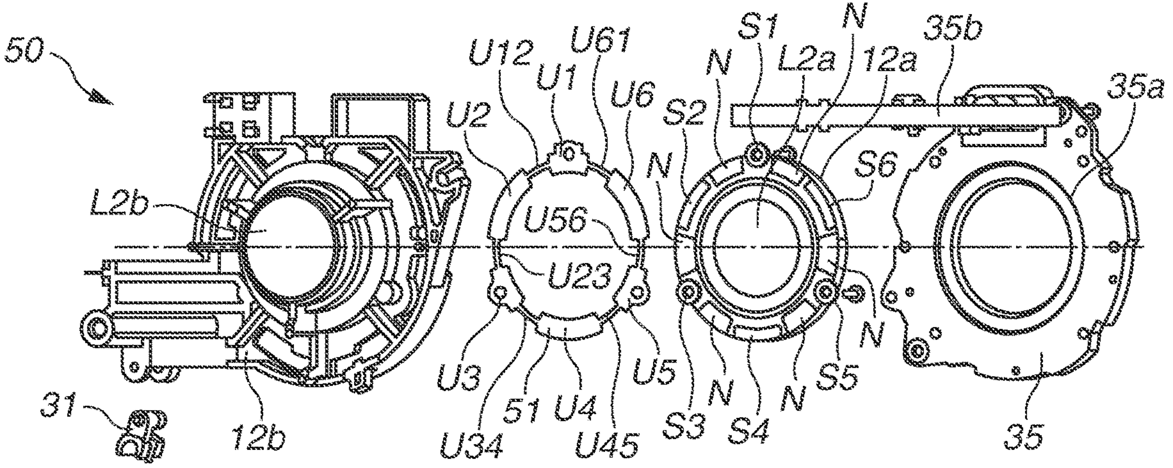
Figure 3:
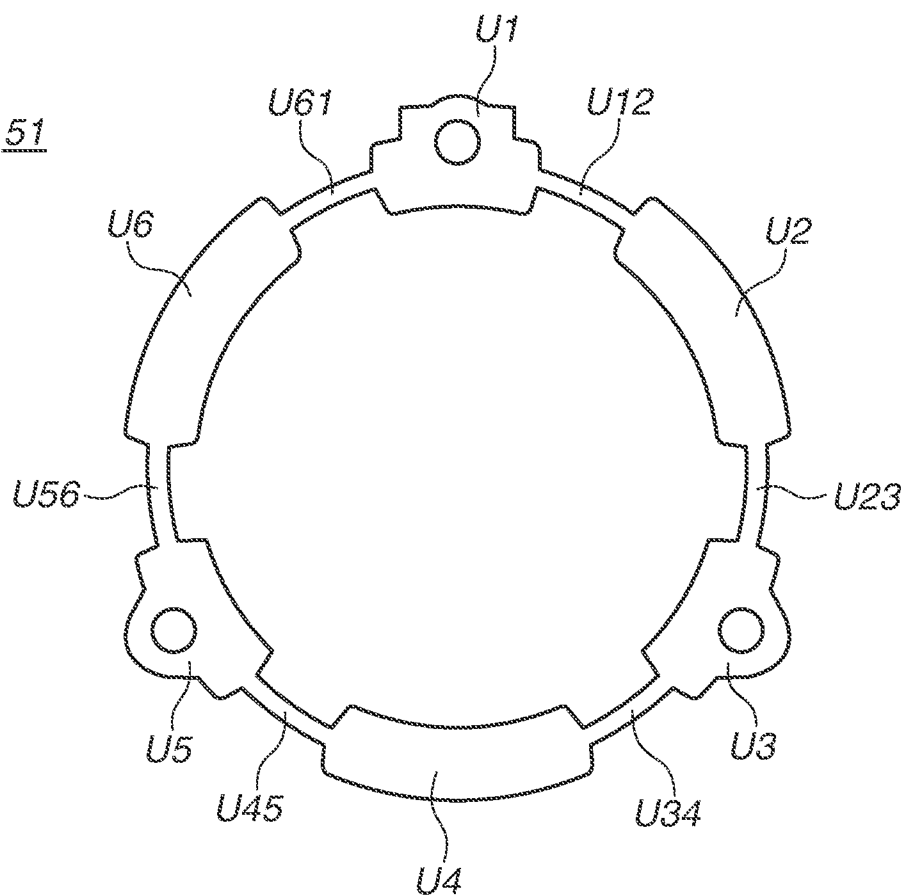
FIG. 3 is a front view illustrating a sheet member according to the first embodiment of the present invention.

A configuration of an imaging apparatus 1 will be described below. FIGS. 1A and 1B are exploded perspective views illustrating the imaging apparatus 1. FIGS. 2A and 2B are exploded perspective views illustrating a second lens unit 50. FIG. 3 is a front view illustrating a sheet member 51.

Figure 4A:
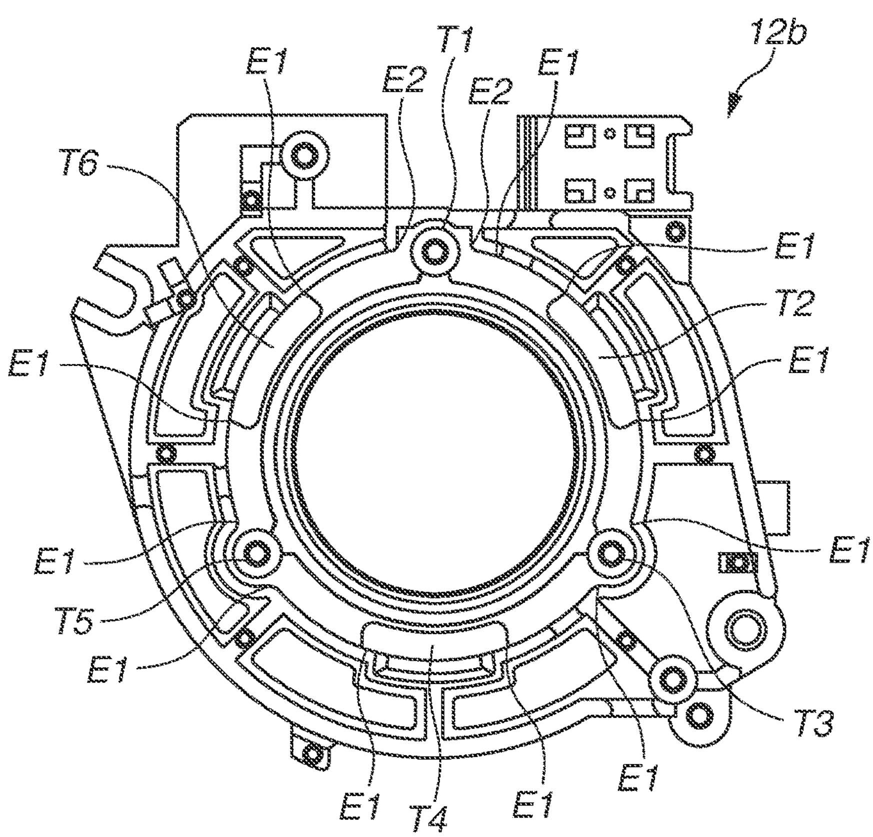
FIGS. 4A and 4B illustrate a reference lens holding frame according to the first embodiment of the present invention.
Figure 4B:
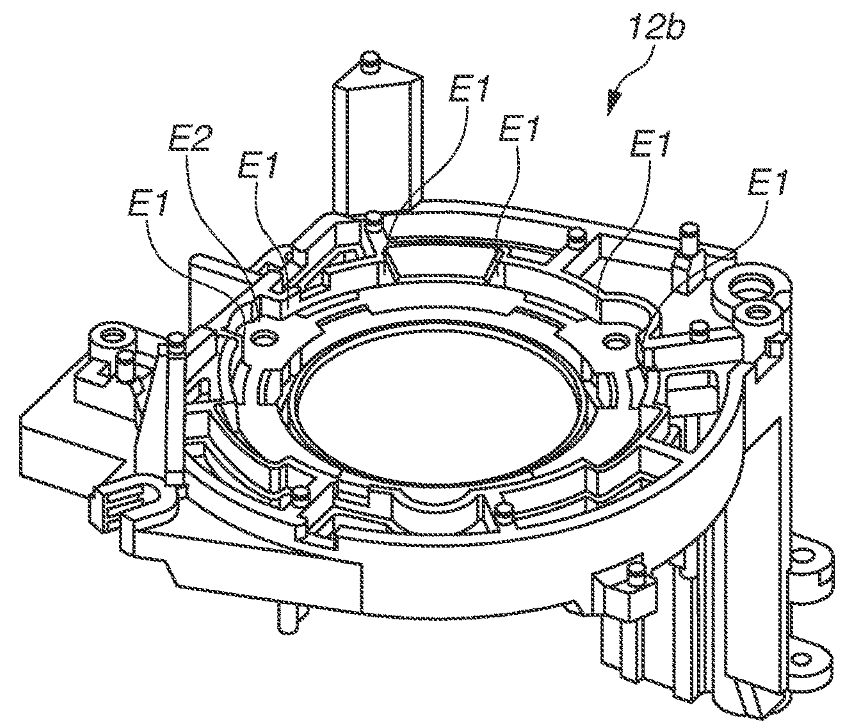
Figure 5:
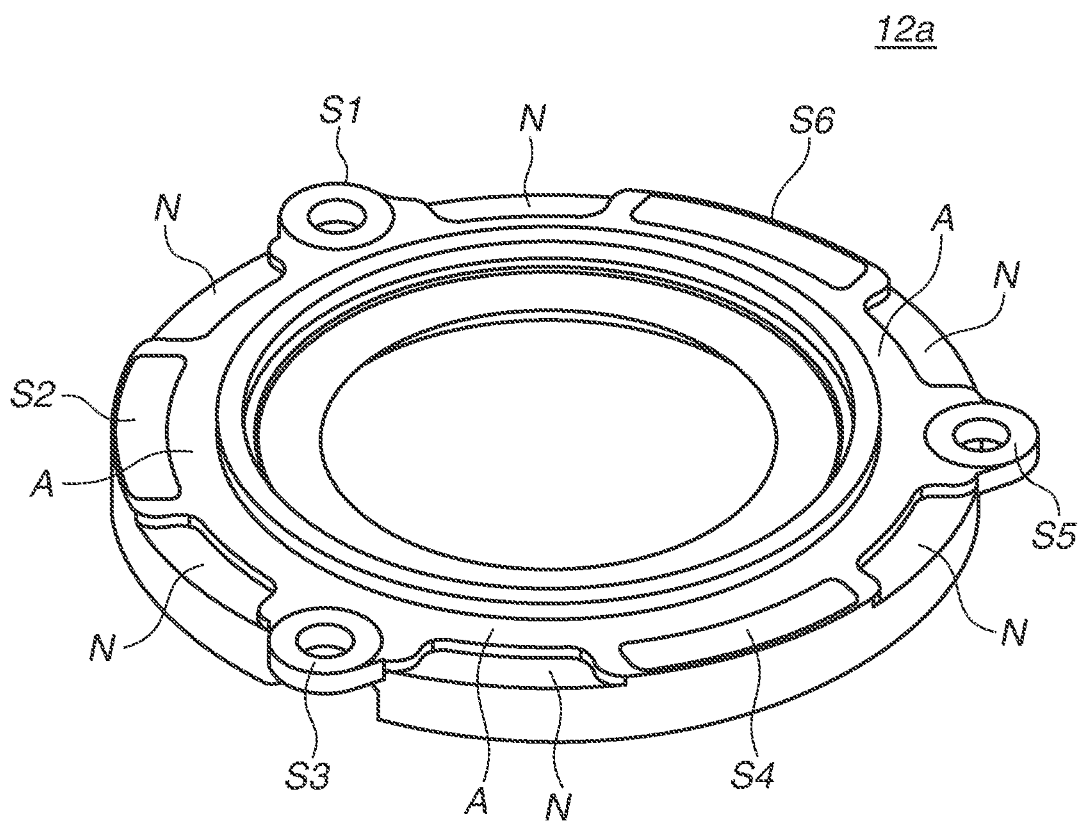
FIG. 5 illustrates an adjustment lens holding frame according to the first embodiment of the present invention.

FIGS. 4A and 4B illustrate a reference lens holding frame 12*b*. FIG. 5 illustrates an adjustment lens holding frame 12*a*.

The imaging apparatus 1 includes a lens barrel 100, an image sensor unit 20, and an optical filter holding frame 18.

The lens barrel 100 includes two different fixed lens units, and three different movable lens units. A first lens unit L1 and a fifth lens unit L5 are fixed in the optical axis direction. A second lens unit L2, a third lens unit L3, and a fourth lens unit L4 are movable in the optical axis direction. When performing zooming, the second lens unit L2, the third lens unit L3, and the fourth lens unit L4 are moved in the optical axis direction. When performing focusing, the fourth lens unit L4 is moved in the optical axis direction.

A first lens holding frame 11 holds the first lens unit L1. The first lens holding frame 11 is fixed to an anterior fixing frame 16 with screws (not illustrated). A fifth lens holding frame 15 holds the fifth lens unit L5. The fifth lens holding frame 15 is fixed to a posterior fixing frame 17 with screws (not illustrated). The anterior fixing frame 16 is bonded to the posterior fixing frame 17 with screws (not illustrated).

As illustrated in FIGS. 2A and 2B, the second lens unit 50 includes the second lens unit L2, a second lens holding frame 12, a diaphragm unit 35, the sheet member 51, and a rack 31. The second lens unit L2 includes an adjustment lens unit L2*a* (a first lens) and a reference lens unit L2*b* (a second lens). The second lens holding frame 12 includes the adjustment lens holding frame 12*a* (a first lens holding frame) and the reference lens holding frame 12*b* (a second lens holding frame).

The adjustment lens holding frame 12*a* holds the adjustment lens unit L2*a*. The adjustment lens unit L2*a* needs to be subjected to the clearance adjustment in the direction of the optical axis of the adjustment lens unit L2*a* and the eccentricity adjustment with respect to the reference lens unit L2*b*.

The reference lens holding frame 12*b* holds the reference lens unit L2*b*. The reference lens unit L2*b* serves as the reference for the clearance and the eccentricity adjustments of the adjustment lens unit L2*a*. As described in detail below, the adjustment mechanism performs the clearance and the eccentricity adjustments by adjusting the position of the adjustment lens holding frame 12*a* with respect to the reference lens holding frame 12*b*. After completion of the clearance and the eccentricity adjustments, the adjustment lens holding frame 12*a* is fixed to the reference lens holding frame 12*b* with an adhesive and screws 36 as fastening members (not illustrated).

The adjustment lens holding frame 12*a* holds the adjustment lens unit L2*a*. As illustrated in FIGS. 2A, 2B, and 5, the adjustment lens holding frame 12*a* is provided with planes S1, S2, S3, S4, S5, and S6 that are annularly and approximately equally disposed as reception planes facing the reference lens holding frame 12*b*. The planes S1, S2, S3, S4, S5, and S6 are raised portions projecting in the optical axis direction. A through-hole for the screw 36 is formed in each of the planes S1, S3, and S5. As illustrated in FIG. 2B, the adjustment lens holding frame 12*a* is provided with notches N at positions facing regions U12, U23, U34, U45, U56, and U61 of the sheet member 51 (described below). When the sheet member 51 (described below) is twisted, the sheet member 51 bends and enters the notches N. The notches N are disposed between the planes S1, S2, S3, S4, S5, and S6. The planes S1, S2, S3, S4, S5, and S6 are second nip portions. Therefore, the notches N are disposed between the second nip portions. The adjustment lens holding frame 12*a* is provided with the planes S1, S2, S3, S4, S5, and S6 projecting in the optical axis direction from a reference surface A, and the notches N recessed in the optical axis direction from the reference surface A. In the circumferential direction of the adjustment lens holding frame 12*a*, the plane S1, the reference surface A, the notch N, the reference surface A, the plane S2, the reference surface A, the notch N, the reference surface A, and the plane S3 are disposed in this order. This means that the reference surface A is disposed between the notches N and the planes S1 to S6. However, the reference surface A may not be provided, and the notches N and the planes S1 to S6 may be alternately disposed.

The reference lens holding frame 12*b* holds the reference lens unit L2*b*. The reference lens holding frame 12*b* is held movably in the optical axis direction by a guide bar 21. A guide bar 22 is engaged with the U groove of the reference lens holding frame 12*b* to regulate the rotation of the reference lens holding frame 12*b* around the guide bar 22. The reference lens holding frame 12*b* is provided with planes T1, T2, T3, T4, T5, and T6 that are annularly and approximately equally disposed as reception planes facing the adjustment lens holding frame 12*a*. The planes T1, T2, T3, T4, T5, and T6 are raised portions projecting in the direction of the optical axis of the reference lens. The planes S1 and T1, the planes S2 and T2, the planes S3 and T3, the planes S4 and T4, the planes S5 and T5, and the planes S6 and T6 are formed in an approximately the same area. A prepared hole for the screw 36 is formed in each of the planes T1, T3, and T5. The planes T1, T2, T3, T4, T5, and T6 are first nip portions.

As illustrated in FIGS. 4A and 4B, the reference lens holding frame 12*b* is provided with engagement portions E1 and E2 to be engaged with the sheet member 51 (described below). The engagement portions E1 and E2 as internal walls of the reference lens holding frame 12*b* position the sheet member 51 with respect to the reference lens holding frame 12*b*. A plurality of engagement portions E1 is provided in the circumferential direction. The engagement portions E1 project in the radially inward direction.

A rack 31 is fixed to the reference lens holding frame 12*b* while being biased in the optical axis direction and rotational direction by a rack spring (not illustrated) and is engaged with a threaded portion 27*a* of a stepping motor 27. The reference lens holding frame 12*b* moves in the optical axis direction via the rack 31 by the rotation of the threaded portion 27*a* of the stepping motor 27.

This enables the second lens holding frame 12 having the reference lens holding frame 12*b* to move in the optical axis direction between a first position closest to the imaging apparatus 20*a* and a second position farthest from the imaging apparatus 20*a*.

The diaphragm unit 35 adjusts the amount of incident light to the lens. The diaphragm unit 35 changes the input current input from the outside to freely change the size of the opening diameter of an opening 35*a* formed of a diaphragm blade (not illustrated), thus adjusting the amount of incident light. The diaphragm unit 35 is electrically connected with a diaphragm flexible printed circuit (FPC) 35*b* for inputting a current from the outside. The diaphragm PFC 35*b* is pulled out from the inside of the lens barrel 100 to the outside of the posterior fixing frame 17 and connected to an external power source. The diaphragm FPC 35*b* is gradually bent with the movement of the second lens unit 12 from the second position farthest from the imaging apparatus 20*a* to the first position closest to the imaging apparatus 20*a*. The diaphragm unit 35 is fixed to the reference lens holding frame 12*b* with screws 37.

The sheet member 51 adjusts the clearance between the adjustment lens holding frame 12*a* and the reference lens holding frame 12*b*. The sheet member 51 is made of, for example, a polyester film. The sheet member 51 is formed through, for example, punching processing on a polyester film or etching processing on a stainless steel. The sheet member 51 is sandwiched between the adjustment lens holding frame 12*a* and the reference lens holding frame 12*b*.

As illustrated in FIG. 3, the sheet member 51 has an approximately annular shape with the through central part, and is provided with regions U1, U2, U3, U4, U5, and U6. The sheet member 51 is also provided with a region U12 between the regions U1 and U2 in a circumferential direction of the sheet member 51, and a region U23 between the regions U2 and U3 in the circumferential direction of the sheet member 51. The sheet member 51 is further provided with a region U34 between the regions U3 and U4 in the circumferential direction of the sheet member 51, and a region U45 between the regions U4 and U5 in the circumferential direction of the sheet member 51. The sheet member 51 is further provided with a region U56 between the regions U5 and U6 in the circumferential direction of the sheet member 51, and a region U61 between the regions U6 and U1 in the circumferential direction of the sheet member 51. A through-hole for the screw 36 is formed in each of the regions U1, U3, and U5. The regions U12, U23, U34, U45, U56, and U61 are formed so that the radial widths of these regions are smaller than the radial widths of the regions U1, U2, U3, U4, U5, and U6. This means that the regions U12, U23, U34, U45, U56, and U61 have lower rigidity and are more likely to be deformed and twisted by an external force than the regions U1, U2, U3, U4, U5, and U6. For the regions U1, U3, and U5, the above-described relation is satisfied even if the size of the through-hole for the screw 36 is reduced from the radial width. The regions U12, U23, U34, U45, U56, and U61 of the sheet member 51 are not in contact with the adjustment lens holding frame 12*a* because of the presence of the notches N of the adjustment lens holding frame 12*a*. The regions U1, U2, U3, U4, U5, and U6 are first sheet portions. The regions U12, U23, U34, U45, U56, and U61 are second sheet portions.

A third lens holding frame 13 holds the third lens unit L3. The third lens holding frame 13 is held movably in the optical axis direction by a guide bar 23. A guide bar 24 is engaged with the U groove of the third lens holding frame 13 to regulate the rotation of the third lens holding frame 13 around the guide bar 24.

A rack 32 is fixed to the third lens holding frame 13 while being biased in the optical axis direction and rotational direction by a rack spring (not illustrated) and is engaged with a threaded portion 28*a* of a stepping motor 28.

The third lens holding frame 13 moves in the optical axis direction via the rack 32 by the rotation of the threaded portion 28*a* of the stepping motor 28. This enables the third lens holding frame 13 to move in the optical axis direction between the first position closest to the imaging apparatus 20*a* and the second position farthest from the imaging apparatus 20*a*.

A fourth lens holding frame 14 holds the fourth lens unit L4. The fourth lens holding frame 14 is held movably in the optical axis direction by the guide bar 23. The guide bar 24 is engaged with the U groove of the fourth lens holding frame 14 to regulate the rotation of the fourth lens holding frame 14 around the guide bar 24.

A rack 33 is fixed to the fourth lens holding frame 14 while being biased in the optical axis direction and rotational direction by a rack spring (not illustrated) and is engaged with a threaded portion 29*a* of a stepping motor 29.

The fourth lens holding frame 14 moves in the optical axis direction via the rack 33 by the rotation of the threaded portion 29*a* of the stepping motor 29. This enables the fourth lens holding frame 14 to move in the optical axis direction between the first position closest to the imaging apparatus 20*a* and the second position farthest from the imaging apparatus 20*a*.

The guide bars 21, 22, 23, and 24 guide the movement of the second lens unit L2, the third lens unit L3, and the fourth lens unit L4 in the optical axis direction.

The guide bars 21, 22, 23, and 24 are sandwiched and fixed by the anterior fixing frame 16 and the posterior fixing frame 17.

A lens FPC 40 is connected with the stepping motors 27, 28, 29, and 30, and the motors activate by supplying power to the motors. The lens FPC 40 is also connected with the diaphragm FPC 35*b* of the diaphragm unit 35, and the diaphragm unit 35 activates by supplying power to the diaphragm unit 35.

A photointerrupter (not illustrated) is mounted on the lens FPC 40. The stepping motors 27 and 28 control the positions of the second lens holding frame 12 and the third lens holding frame 13, respectively, based on the output of the photointerrupter (not illustrated). The stepping motors 29 and 30 control the positions of the fourth lens holding frame 14 and the optical filter holding frame 18, respectively, based on the output of the photointerrupter (not illustrated).

The image sensor unit 20 includes the imaging apparatus 20*a* and is fixed to an image sensor unit holding frame 19 with screws (not illustrated). The image sensor unit holding frame 19 is bonded to the posterior fixing frame 17 with screws (not illustrated).

The optical filter holding frame 18 holds an infrared cut filter 38 and a dummy glass 39, and is held movably in a direction perpendicular to the optical axis by a guide bar 25. A guide bar 26 is engaged with the U groove of the optical filter holding frame 18 to regulate the rotation of the optical filter holding frame 18 around the guide bar 26. The guide bars 25 and 26 are sandwiched and fixed by the posterior fixing frame 17 and the image sensor unit holding frame 19.

A rack 34 is fixed to the optical filter holding frame 18 while being biased in a direction perpendicular to the optical axis direction and the rotational direction by a rack spring (not illustrated) and is engaged with a threaded portion 30*a* of a stepping motor 30. The optical filter holding frame 18 moves in a direction perpendicular to the optical axis via the rack 34 by the rotation of the threaded portion 30*a* of the stepping motor 30. This enables switching between the infrared cut filter 38 and the dummy glass 39 as an optical filter on the optical path.

When the infrared cut filter 38 is inserted into the optical path, and the dummy glass 39 is retracted from the optical path, visible light can be condensed while cutting an infrared light. This state is an imaging mode called the day mode that enables capturing a subject in the daytime. When the infrared cut filter 38 is retracted from the optical path and the dummy glass 39 is inserted into the optical path, not only visible light but also an infrared light can be condensed. This state is an imaging mode called the night mode that enables capturing a subject in the nighttime.

The optical adjustment as the adjustment of the position of the second lens unit 50 will be described below.

The optical adjustment of the second lens unit 50 includes the clearance and the eccentricity adjustments performed in this order. The clearance adjustment refers to a position adjustment between the adjustment lens holding frame 12*a* and the reference lens holding frame 12*b* in the direction of the optical axis of the second lens unit 50. The eccentricity adjustment refers to a position adjustment of the adjustment lens holding frame 12*a* with respect to the reference lens holding frame 12*b* in a direction perpendicular to the optical axis of the second lens unit 50.

The clearance adjustment is performed by sandwiching the sheet member 51 between the adjustment lens holding frame 12*a* and the reference lens holding frame 12*b*. A plurality of types of sheet members 51 is prepared for different thicknesses and selectively used based on the clearance between the adjustment lens unit L2*a* and the reference lens unit L2*b*. The thickness of the sheet member 51 is determined by directly measuring the clearance between the adjustment lens unit L2*a* and the reference lens unit L2*b*.

If it is difficult to directly measure the clearance between the adjustment lens unit L2*a* and the reference lens unit L2*b*, the reference lens holding frame 12*b* is attached to an adjustment tool (not illustrated). Then, the adjustment lens holding frame 12*a* may be temporarily fixed to the reference lens holding frame 12*b* by using a temporary positioning mechanism (not illustrated). Then, the thickness of the sheet member 51 may be determined by measuring the optical performance such as the aberration and contrast.

Figure 6:
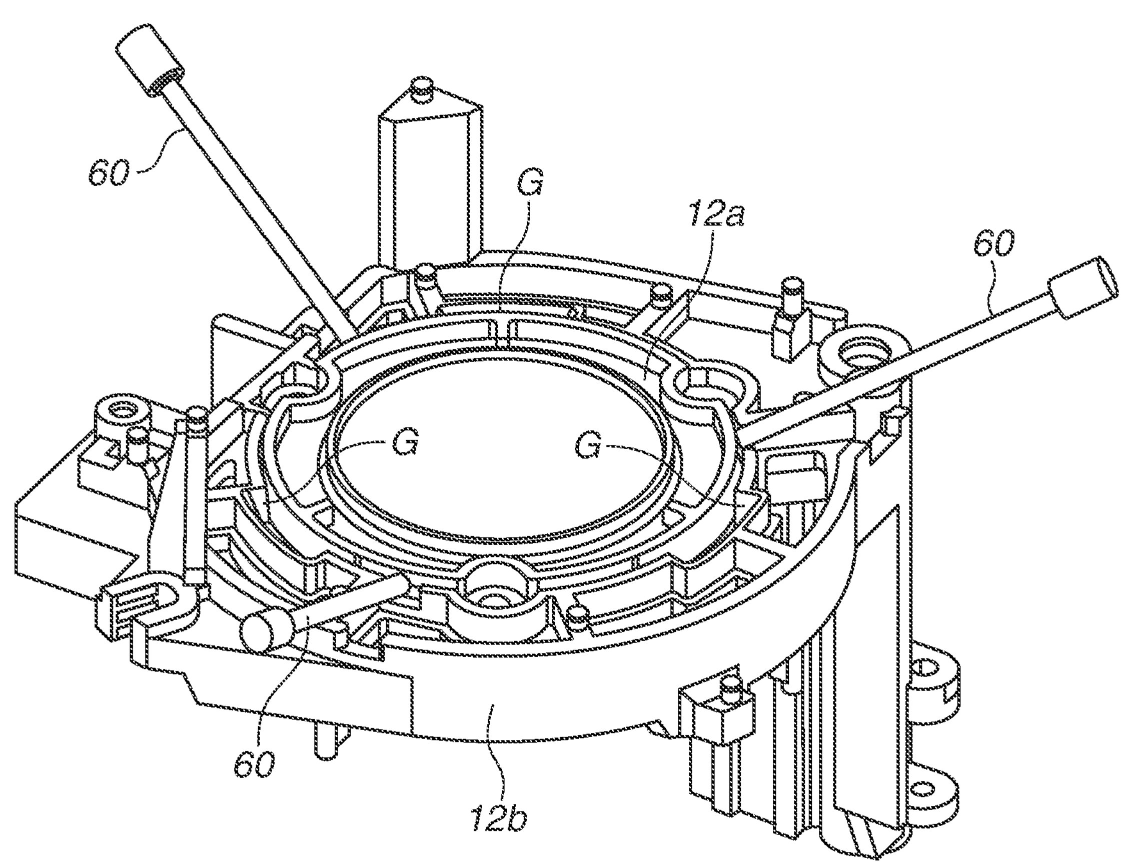
FIG. 6 illustrates a state of eccentricity adjustment of the second lens unit according to the first embodiment of the present invention.

FIG. 6 illustrates a state of the eccentricity adjustment of the second lens unit 50. In the eccentricity adjustment, the sheet member 51 having the thickness determined by the clearance adjustment is sandwiched between the adjustment lens holding frame 12*a* and the reference lens holding frame 12*b*. In this state, as illustrated in FIG. 6, the position of the adjustment lens holding frame 12*a* is adjusted along a plane intersecting with the optical axis by using three adjustment pins 60 of an adjustment tool (not illustrated).

The three adjustment pins 60 are disposed at approximately equal intervals in the circumferential direction centering on the optical axis, and come in contact with the outer circumferential surface of the adjustment lens holding frame 12*a*. A predetermined adjustment clearance is provided in the radial direction between the outer circumferential surface of the adjustment lens holding frame 12*a* and the inner circumferential surface of the reference lens holding frame 12*b*. This enables the adjustment lens holding frame 12*a* to change its position with respect to the reference lens holding frame 12*b* by the adjustment clearance. Therefore, changing the radial positions of the three adjustment pins 60 enables adjusting the position of the adjustment lens holding frame 12*a* along a plane intersecting with the optical axis.

This eccentric adjustment is performed by searching for the best position of the adjustment lens holding frame 12*a* while measuring the optical performance such as the aberration and contrast. After completion of the eccentricity adjustment, the adjustment lens holding frame 12*a* is fixed to the reference lens holding frame 12*b* at the best position with an adhesive. The adhesive, for example, an ultraviolet curable adhesive is injected into three different adhesive grooves G of the reference lens holding frame 12*b*. Then, the adhesive adheres to the outer circumferential surface of the adjustment lens holding frame 12*a* and cures when irradiated with an ultraviolet ray. According to the present embodiment, the adjustment lens holding frame 12*a* is fixed to the reference lens holding frame 12*b* with an adhesive, and then further firmly fixed thereto with the three screws 36.

Figure 7:
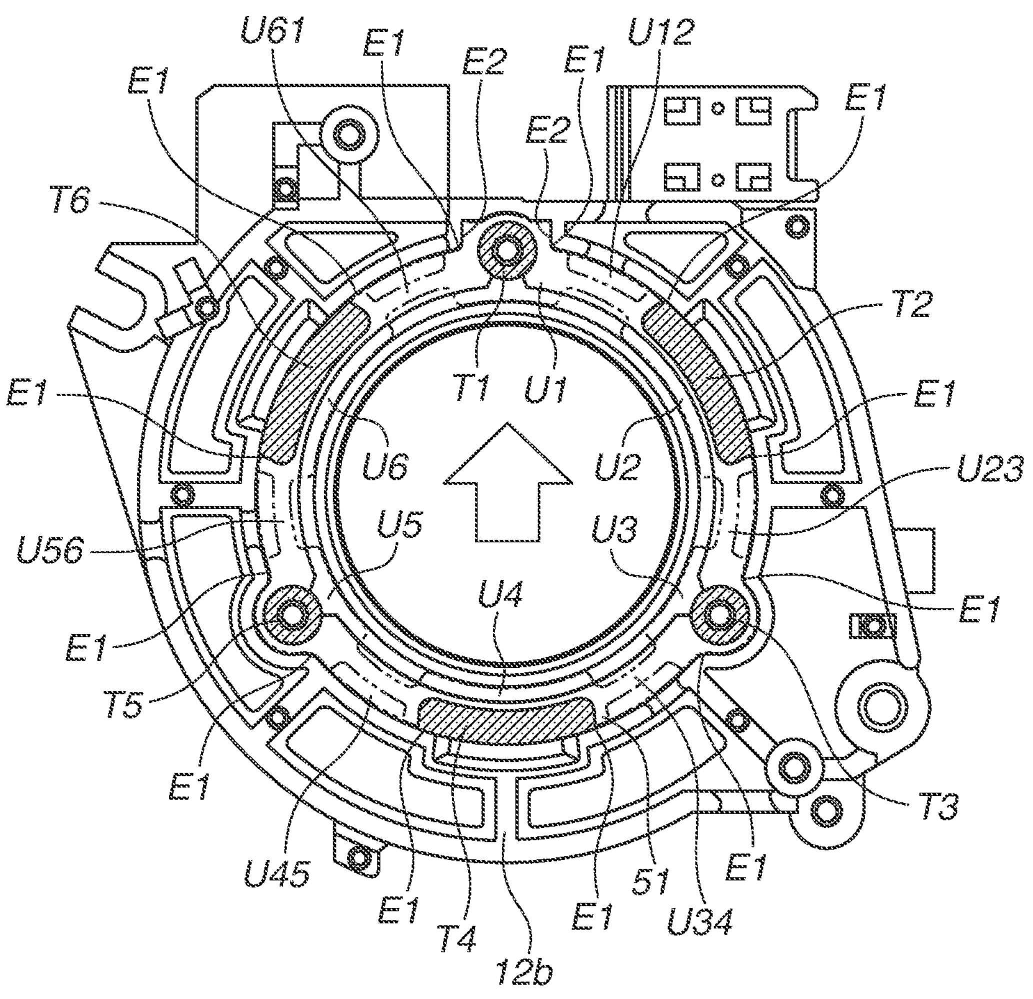
FIG. 7 illustrates an engagement state of the reference lens holding frame and the sheet member according to the first embodiment of the present invention.

The relation between the reference lens holding frame 12*b* and the sheet member 51 will be described below. FIG. 7 illustrates a state where the reference lens holding frame 12*b* is engaged with the sheet member 51. For the convenience of explanation, the sheet member 51 is drawn with dotted lines, and the planes T1, T2, T3, T4, T5, and T6 of the reference lens holding frame 12*b* are hatched. The adjustment lens holding frame 12*a* is not illustrated.

As illustrated in FIG. 7, the sheet member 51 is engaged with the engagement portions E1 and E2 as internal walls of the reference lens holding frame 12*b*, and the position of the sheet member 51 with respect to the reference lens holding frame 12*b* is determined.

The engagement portions E1 are provided in the vicinities of the planes T1, T2, T3, T4, T5, and T6 of the reference lens holding frame 12*b* to regulate the radial position of the sheet member 51. The engagement portions E2 are provided in the vicinities of the planes T1 to regulate the rotation of the sheet member 51 in the circumferential direction.

When the sheet member 51 is sandwiched and fixed by the adjustment lens holding frame 12*a* and the reference lens holding frame 12*b*, the region U1 is sandwiched between the planes S1 and T1, and the region U2 is sandwiched between the planes S2 and T2. When the sheet member 51 is sandwiched and fixed by the adjustment lens holding frame 12*a* and the reference lens holding frame 12*b*, the region U3 is sandwiched between the planes S3 and T3, the region U4 is sandwiched between the planes S4 and T4, the region U5 is sandwiched between the planes S5 and T5, and the region U6 is sandwiched between the planes S6 and T6.

A twist of the sheet member 51 during the eccentricity adjustment will be described below. When the adjustment lens holding frame 12*a* is moved on the sheet member 51 during the eccentric adjustment, a frictional force occurs between the sheet member 51 and the adjustment lens holding frame 12*a*. For example, as illustrated in FIG. 7, when the adjustment lens holding frame 12*a* (not illustrated) is moved in the direction of the arrow, the sheet member 51 is applied with a frictional force between the adjustment lens holding frame 12*a* and the sheet member 51 in the direction of the arrow. Therefore, the region in the direction of the arrow (the region in the upper half of the drawing in FIG. 7) is regulated in movement and is unlikely to be deviated in position since the frictional force is applied in the direction toward the engagement portions E1. On the other hand, the region in the direction opposite to the direction of the arrow (the region in the lower half of the drawing in FIG. 7) is not regulated in movement and may be deviated in position since the frictional force is applied in the direction away from the engagement portions E1. In this case, a compressing force is applied to the vicinity of the above-described two regions, and the low-rigidity regions U23 and U56 are deformed and twisted.

When an external force is applied to the sheet member 51 in this way, the low-rigidity regions are twisted but high-rigidity regions are not twisted. Therefore, the high-rigidity regions of the sheet member 51 sandwiched between the receiving surfaces of the adjustment lens holding frame 12*a* and the reference lens holding frame 12*b* are not twisted, and therefore the optical performance is not affected.

If the relevant region is largely twisted, the low-rigidity regions of the sheet member 51 are twisted so as to position within the notches N illustrated in FIG. 2B. This enables reducing the interference of the adjustment lens holding frame 12*a*.

The present invention performs control so that twisted positions of the sheet member 51 for the clearance adjustment are positions not affecting the optical performance, and provides a lens barrel that enables high-accuracy clearance and eccentricity adjustments of lenses or lens holding frames with a simple configuration.

Figure 8:
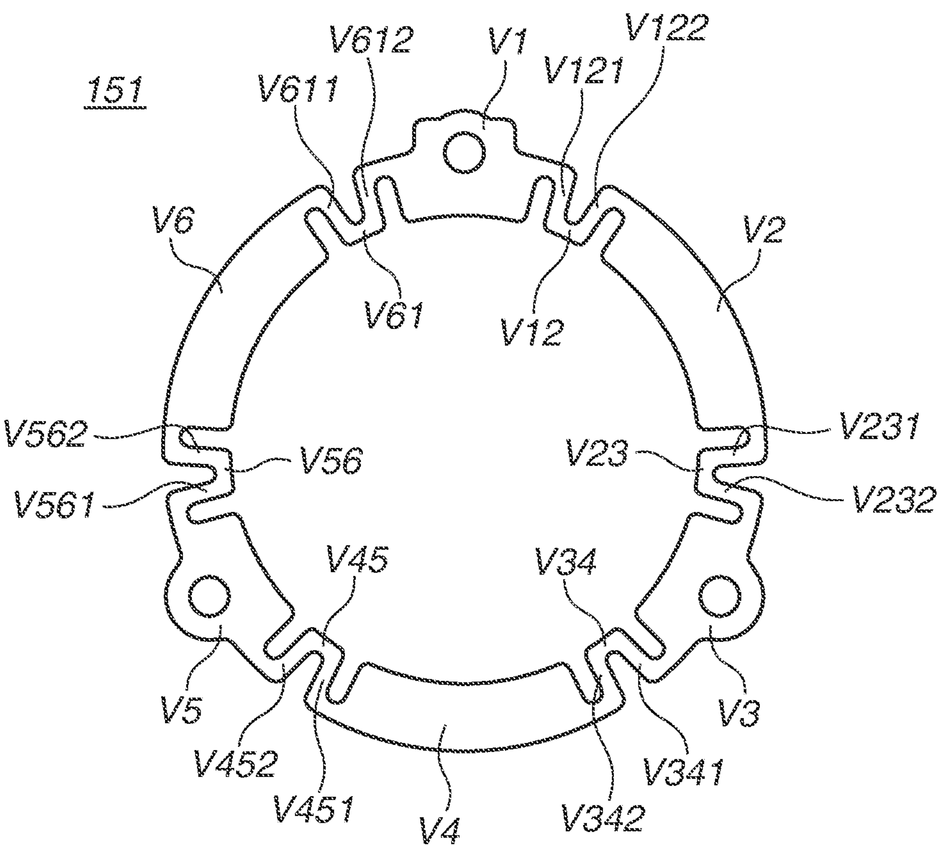
FIG. 8 is a front view illustrating a sheet member according to a second embodiment of the present invention.

A second embodiment will be described below centering on a lens barrel according to an embodiment different from the first embodiment of the present invention. The present embodiment differs from the first embodiment only in the shapes of low-rigidity portions of a sheet member. FIG. 8 is a front view illustrating a sheet member 151.

The sheet member 151 according to the present embodiment is provided with regions V1, V2, V3, V4, V5, and V6. The sheet member 151 is also provided with a region V12 between the regions V1 and V2, and a region V23 between the regions V2 and V3. The sheet member 151 is further provided with a region V34 between the regions V3 and V4, a region V45 between the regions V4 and V5, a region V56 between the regions V5 and V6, and a region V61 between the regions V6 and V1. The regions V12, V23, V34, V45, V56, and V61 are approximately U-shaped.

When the sheet member 151 is sandwiched and fixed by the adjustment lens holding frame 12*a* and the reference lens holding frame 12*b*, the region V1 is sandwiched between the planes S1 and T1, and the region V2 is sandwiched between the planes S2 and T2. When the sheet member 151 is sandwiched and fixed by the adjustment lens holding frame 12*a* and the reference lens holding frame 12*b*, the region V3 is sandwiched between the planes S3 and T3, the region V4 is sandwiched between the planes S4 and T4, the region V5 is sandwiched between the planes S5 and T5, and the region V6 is sandwiched between the planes S6 and T6.

A through-hole for the screw 36 is formed in each of the regions V1, V3, and V5. As illustrated in FIG. 8, the region V12 is radially curved so as to provide a radial width smaller than the widths of the regions V1 and V2 and include radially extending regions V121 and V122.

As illustrated in FIG. 8, the region V23 is radially curved so as to provide a radial width smaller than the widths of the regions V2 and V3 and include radially extending regions V231 and V232. As illustrated in FIG. 8, the region V34 is radially curved so as to provide a radial width smaller than the widths of the regions V3 and V4 and include radially extending regions V341 and V342. As illustrated in FIG. 8, the region V45 is radially curved so as to provide a radial width smaller than the widths of the regions V4 and V5 and include radially extending regions V451 and V452.

As illustrated in FIG. 8, the region V56 is radially curved so as to provide a radial width smaller than the widths of the regions V5 and V6 and include radially extending regions V561 and V562. As illustrated in FIG. 8, the region V61 is radially curved so as to provide a radial width smaller than the widths of the regions V6 and V1 and include radially extending regions V611 and V612.

Further, the regions V12, V23, V34, V45, V56, and V61 are formed to provide an approximately constant width in the extending direction. The regions V12, V23, V34, V45, V56, and V61 have lower rigidity and are more likely to be deformed and twisted by an external force than the regions V1, V2, V3, V4, V5, and V6. For the regions V1, V3, and V5, the above-described relation is satisfied even if the size of the through-hole for the screw 36 is reduced from the radial width.

With the sheet member 151 according to the present embodiment, low-rigidity regions are radially curved in this way. Therefore, the sheet member 151 is more likely to be deformed and twisted by a frictional force applied during the eccentricity adjustment than the sheet member 51 according to the first embodiment.

The present invention performs control so that twisted positions of the sheet member 151 for the clearance adjustment are positions not affecting the optical performance, and provides a lens barrel that enables high-accuracy clearance and eccentricity adjustments of lenses or lens holding frames with a simple configuration.

Figure 9:
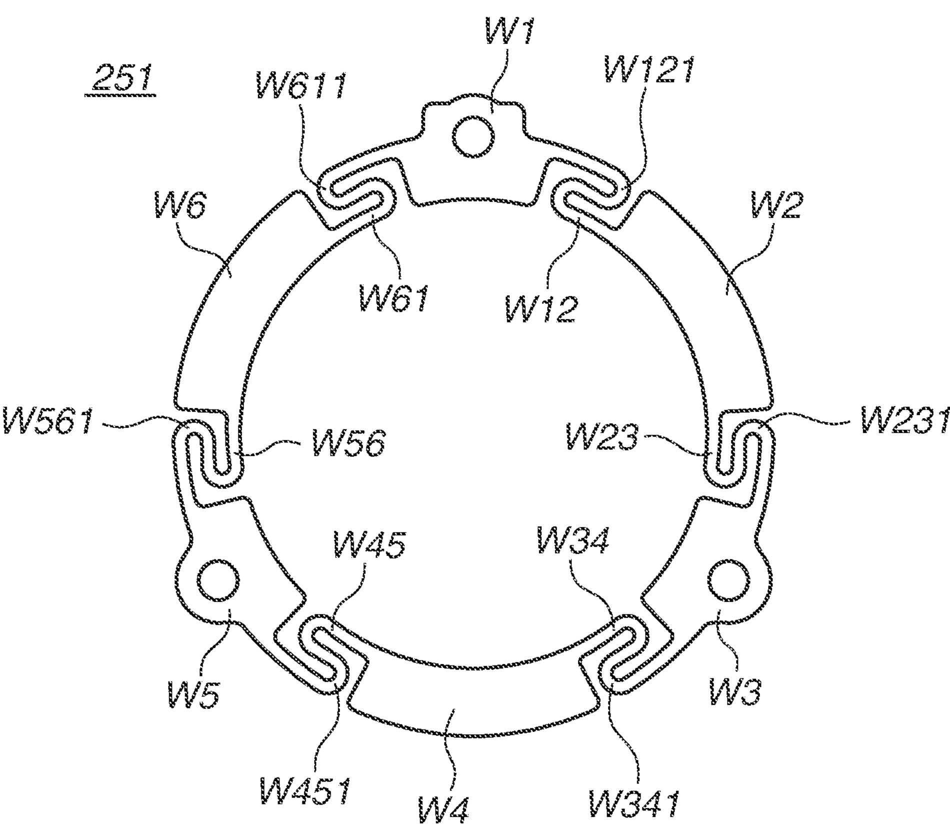
FIG. 9 is a front view illustrating a sheet member according to a third embodiment of the present invention.

A third embodiment will be described below centering on a lens barrel according to an embodiment different from the first and second embodiments of the present invention. The present embodiment differs from the first and second embodiments only in the shapes of low-rigidity portions of a sheet member. FIG. 9 is a front view illustrating a sheet member 251.

The sheet member 251 according to the present embodiment is provided with the regions W1, W2, W3, W4, W5, and W6. The sheet member 251 according to the present embodiment is provided with a region W12 between the regions W1 and W2, a region W23 between the regions W2 and W3, and a region W34 between the regions W3 and W4. The sheet member 251 according to the present embodiment is also provided with a region W45 between the regions W4 and W5, a region W56 between the regions W5 and W6, and a region W61 between the regions W6 and W1. The regions W12, W23, W34, W45, W56, and W61 are each curved at two different portions, i.e., these regions are each provided with two different curved portions.

With the sheet member 251 according to the present embodiment, when the adjustment lens holding frame 12*a* is fixed to the reference lens holding frame 12*b*, the region W1 is sandwiched between the planes S1 and T1, the region W2 is sandwiched between the planes S2 and T2, the region W3 is sandwiched between the planes S3 and T3, the region W4 is sandwiched between the planes S4 and T4, the region W5 is sandwiched between the planes S5 and T5, and the region W6 is sandwiched between the planes S6 and T6. A through-hole for the screw 36 is formed in each of the regions W1, W3, and W5. As illustrated in FIG. 9, the region W12 is radially curved so as to provide a radial width smaller than the widths of the regions W1 and W2 and include a radially extending region W121. As illustrated in FIG. 9, the region W23 is radially curved so as to provide a radial width smaller than the widths of the regions W2 and W3 and include a radially extending region W231. As illustrated in FIG. 9, the region W34 is radially curved so as to provide a radial width smaller than the widths of the regions W3 and W4 and include a radially extending region W341. As illustrated in FIG. 9, the region W45 is radially curved so as to provide a radial width smaller than the widths of the regions W4 and W5 and include a radially extending region W451. As illustrated in FIG. 9, the region W56 is radially curved so as to provide a radial width smaller than the widths of the regions W5 and W6 and include a radially extending region W561. As illustrated in FIG. 9, the region W61 is radially curved so as to provide a radial width smaller than the widths of the regions W6 and W1 and include a radially extending region W611.

Further, the regions W12, W23, W34, W45, W56, and W61 are formed to provide an approximately constant width in the extending direction. More specifically, the regions W12, W23, W34, W45, W56, and W61 have lower rigidity and are more likely to be deformed and twisted by an external force than the regions W1, W2, W3, W4, W5, and W6. For the regions W1, W3, and W5, the above-described relation is satisfied even if the size of the through-hole for the screw 36 is reduced from the radial width.

With the sheet member 251 according to the present embodiment, low-rigidity regions are radially curved in this way. Therefore, the sheet member 251 is more likely to be deformed and twisted by a frictional force applied during the eccentricity adjustment than the sheet member 51 according to the first embodiment.

The present invention performs control so that twisted positions of the sheet member 251 for the clearance adjustment are positions not affecting the optical performance, and provides a lens barrel that enables high-accuracy clearance and eccentricity adjustments of lenses or lens holding frames with a simple configuration.

A fourth embodiment will be described below centering on a lens barrel according to an embodiment different from the first, second, and third embodiments of the present invention. The present embodiment has no adjustment lens holding frame unlike the first, second, and third embodiments.

Therefore, the present embodiment performs the position adjustments of the adjustment lens during the eccentricity adjustment. More specifically, during the eccentricity adjustment, the position of the adjustment lens is adjusted along a plane intersecting with the optical axis by using the three adjustment pins 60. After completion of the eccentricity adjustment of the position of the adjustment lens, the adjustment lens is fixed to the reference lens holding frame 12*b* by using pressing members. More specifically, the pressing members are disposed to cover the adjustment lens from the optical axis direction to sandwich the adjustment lens between the pressing members and the reference lens holding frame 12*b*.

The present invention performs control so that twisted positions of the sheet member for the clearance adjustment are positions not affecting the optical performance, and provides a lens barrel that enables high-accuracy clearance and eccentricity adjustments of lenses or lens holding frames with a simple configuration.

In the above-described embodiments, a twist of the sheet member occurs during the eccentricity adjustment. However, other possible timings when a twist of the sheet member occurs include the timing when the adjustment lens holding frame 12*a* is placed on the reference lens holding frame 12*b* via the sheet member, and the timing when the adjustment lens holding frame 12*a* is fixed to the reference lens holding frame 12*b* with the screws 36.

Although the above-described embodiments perform the clearance and eccentricity adjustments by using the adjustment lens unit L2*a* and the reference lens unit L2*b*, the present invention is not limited thereto. For example, to perform the eccentricity adjustment by using all of the first lens unit L1, the second lens unit L2, the third lens unit L3, the fourth lens unit L4, and the fifth lens unit L5, the adjustments may be performed in the assembled state of the lens barrel. If it is hard to perform the adjustments in the assembled state, an adjustment tool that can reproduce a state corresponding to the assembled state may be used.

Although the above-described embodiments use one sheet member for the clearance adjustment, a plurality of sheet members may be used. For example, to perform the clearance adjustment for 20 μm, two different sheet members with a thickness of 10 μm may be used.

Although, in the above-described embodiments, the adjustment lens holding frame 12*a* is provided with the notches N, the reference lens holding frame 12*b* may be provided with the notches N. Also, both the adjustment lens holding frame 12*a* and the reference lens holding frame 12*b* may be provided with the notches N.

While the present invention has specifically been described based on the above-described embodiments, the present invention is not limited thereto but can be modified and changed in diverse ways within the scope of the appended claims.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-098474, filed Jun. 17, 2022, which is hereby incorporated by reference herein in its entirety.

What is claimed is:

1. A lens barrel capable of performing position adjustments by moving a first lens holding frame for holding a first lens in a direction intersecting with an optical axis, the lens barrel comprising:

a first lens holding frame configured to hold a first lens;

a second lens holding frame configured to hold a second lens; and a sheet member having an annular shape configured to be sandwiched between the first lens holding frame and the second lens holding frame, wherein the second lens holding frame is provided with at least two first nip portions for sandwiching the sheet member between the first lens holding frame and the second lens holding frame, wherein the first lens holding frame is provided with at least two second nip portions for sandwiching the sheet member between the first lens holding frame and the second lens holding frame, wherein the sheet member is provided with first sheet portions to be sandwiched by the first and second nip portions, and second sheet portions not to be sandwiched by the first and second nip portions and to be positioned between the first and second nip portions in a circumferential direction of the sheet member, and wherein radial widths of the second sheet portions are smaller than radial widths of the first sheet portions.

2. The lens barrel according to claim 1, wherein a clearance between the first lens and second lens holding frames in an optical axis direction is adjusted by a thickness of the sheet member.

3. The lens barrel according to claim 1, wherein a plurality of the first nip portions is annularly and equally disposed.

4. The lens barrel according to claim 1, wherein a plurality of the second nip portions is annularly and equally disposed.

5. The lens barrel according to claim 1, wherein the sheet member is engaged with the second lens holding frame in vicinities of the first nip portions of the second lens holding frame.

6. The lens barrel according to claim 1, wherein the first lens holding frame is provided with notches between the second nip portions.

7. The lens barrel according to claim 1, wherein the first nip portions of the second lens holding frame are raised portions projecting in an optical axis direction of the second lens.

8. The lens barrel according to claim 1, wherein the second nip portions of the first lens holding frame are raised portions projecting in an optical axis direction of the second lens.

9. The lens barrel according to claim 1, wherein the first nip portions are disposed to face the second nip portions, and the first nip portions and the second nip portions have the same area.

10. The lens barrel according to claim 1, wherein the first lens holding frame and the second lens holding frame are fixed with an adhesive.

11. The lens barrel according to claim 1, wherein the first lens holding frame and the second lens holding frame are fixed with fastening members.

12. The lens barrel according to claim 1, wherein the second sheet portions are each provided with a radially extending region.

13. The lens barrel according to claim 1, wherein the second sheet portions are each curved.

* * * * *